United States Patent
Klos et al.

(10) Patent No.: US 10,919,004 B2
(45) Date of Patent: Feb. 16, 2021

(54) SEAWATER AERATION SYSTEM

(71) Applicant: DOOSAN LENTJES GMBH, Ratingen Nordrhein-Westfalen (DE)

(72) Inventors: Jürgen Klos, Seebach (DE); Michael Petri, Minheim (DE); Annette Ziemann-Nöthe, Essen (DE); Karl-Heinz Röder, Oberstaufen (DE)

(73) Assignee: DOOSAN LENTJES GMBH, Ratingen Nordrhein-Westfalen (DE)

( * ) Notice: Subject to any disclaimer, the term of this patent is extended or adjusted under 35 U.S.C. 154(b) by 233 days.

(21) Appl. No.: 16/315,276

(22) PCT Filed: Jul. 31, 2017

(86) PCT No.: PCT/EP2017/069302
§ 371 (c)(1),
(2) Date: Jan. 4, 2019

(87) PCT Pub. No.: WO2018/046184
PCT Pub. Date: Mar. 15, 2018

(65) Prior Publication Data
US 2019/0308143 A1    Oct. 10, 2019

(30) Foreign Application Priority Data

Sep. 9, 2016 (EP) .................................... 16188080

(51) Int. Cl.
*B01F 3/04* (2006.01)
*C02F 3/20* (2006.01)
(Continued)

(52) U.S. Cl.
CPC ...... *B01F 3/04269* (2013.01); *B01D 53/1425* (2013.01); *B01D 53/1481* (2013.01);
(Continued)

(58) Field of Classification Search
CPC .... B01F 3/04; B01F 3/04106; B01F 3/04241; B01F 3/04269; B01F 2003/04184;
(Continued)

(56) References Cited

U.S. PATENT DOCUMENTS

| 5,013,493 A * | 5/1991 | Tharp ................... B01F 3/0412 |
| | | 210/220 |
| 5,868,972 A | 2/1999 | Galich et al. |

(Continued)

FOREIGN PATENT DOCUMENTS

EP    2 100 657 B1    1/2013

OTHER PUBLICATIONS

International Search Report for PCT/EP2017/069302 dated Sep. 29, 2017 [PCT/ISA/210].

(Continued)

*Primary Examiner* — Robert A Hopkins
(74) *Attorney, Agent, or Firm* — Invenstone Patent, LLC

(57) ABSTRACT

The invention relates to an aeration system for seawater oxidation in flue gas purification devices, with at least one tubular diffuser (TD), covered by at least two perforated membranes (20), which are positioned one after the other and at a distance to each other in a direction of the central longitudinal axis (A) of the diffuser (TD) as well as at least one support member (SP), which encircles a membrane-free section (FS) of the tubular diffuser at least partially, and at least one sliding means (40), arranged between the support member (SP) and the membrane-free section (FS) of the tubular diffuser (TD).

13 Claims, 4 Drawing Sheets

Figure 1:
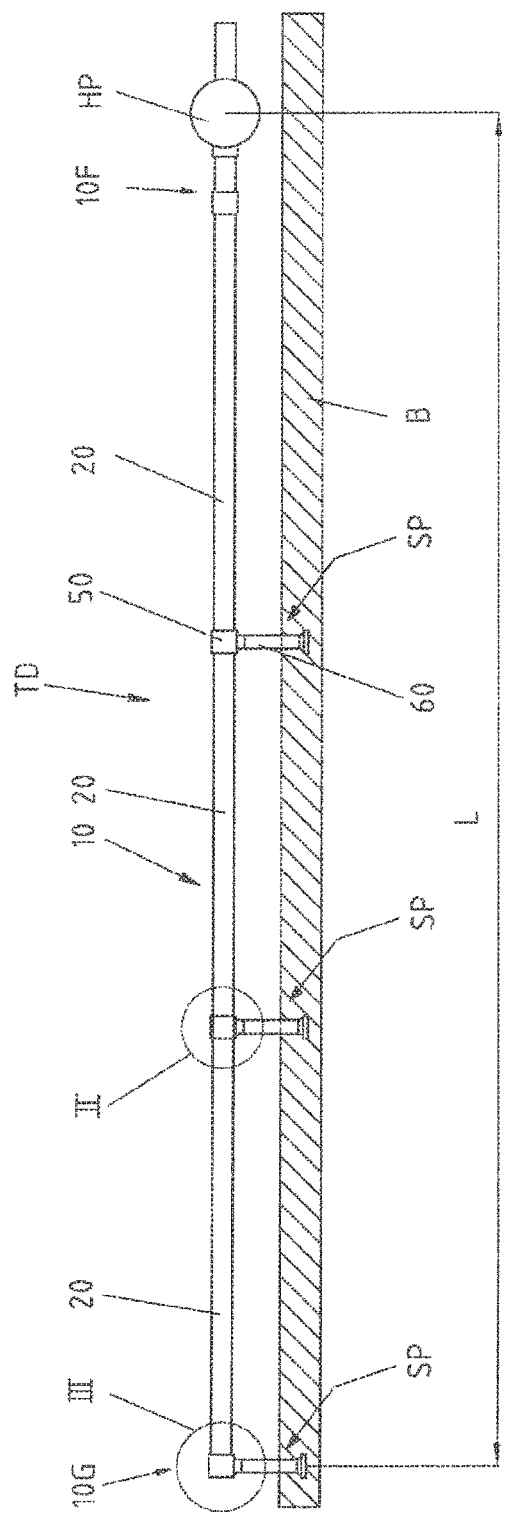

(51) Int. Cl.
*B01D 53/14* (2006.01)
*C02F 1/74* (2006.01)
*F23J 15/00* (2006.01)
*F23J 15/04* (2006.01)
*C02F 103/08* (2006.01)
*C02F 103/18* (2006.01)
*F16L 21/06* (2006.01)

(52) U.S. Cl.
CPC ............ *B01F 3/04241* (2013.01); *C02F 1/74* (2013.01); *C02F 3/201* (2013.01); *C02F 3/208* (2013.01); *F23J 15/006* (2013.01); *F23J 15/04* (2013.01); *B01F 2003/04184* (2013.01); *B01F 2003/04191* (2013.01); *B01F 2003/04276* (2013.01); *B01F 2003/04319* (2013.01); *B01F 2003/04404* (2013.01); *C02F 2103/08* (2013.01); *C02F 2103/18* (2013.01); *F16L 21/06* (2013.01); *F23J 2900/15041* (2013.01)

(58) Field of Classification Search
CPC .. F16L 21/06; C02F 3/20; C02F 3/201; C02F 3/208
See application file for complete search history.

(56) References Cited

U.S. PATENT DOCUMENTS

| | | |
|---|---|---|
| 2003/0071377 A1 | 4/2003 | Tharp |
| 2004/0124550 A1 | 7/2004 | Casper et al. |
| 2007/0013089 A1 | 1/2007 | Sasajima |
| 2012/0061862 A1 | 3/2012 | Tharp et al. |
| 2012/0187050 A1 | 7/2012 | Sonoda et al. |
| 2014/0070433 A1 | 3/2014 | Ott et al. |

OTHER PUBLICATIONS

Written Opinion for PCT/EP2017/069302 dated Sep. 29, 2017 [PCT/ISA/237].

* cited by examiner

SEAWATER AERATION SYSTEM

The invention relates to an aeration system for seawater oxidation in a flue gas purification device of a power plant or similar industrial application, wherein the seawater is treated in a corresponding aeration basin of considerable space (width: 10-50 meters, length: 10 to 100 meters, depth: 2 to 5 meters).

In a generic flue gas purification device, as disclosed in EP 2100657B1, fresh seawater is used to clean flue gases and the used seawater is aerated before redirected into the sea.

It is known to use an aeration system, which comprises tubular diffusers, each of which features a tubular body, defining an inner hollow space and a central longitudinal axis, wherein the tubular body has zones featuring air outlet ports, each of which extends from the hollow space outwardly and through the tubular body, and a perforated, elastic membrane, which is positioned over and in contact with said zones of the tubular body provided with outlet ports.

Accordingly these tubular diffusers are part of a larger aeration system, typically including a multiplicity of diffusers and at least one header pipe, to which pressurized gas (e.g. air or oxygen) is supplied before flowing into the diffuser bodies and from there through the outlet ports and through the membranes into the liquid to be treated.

Considerable lengths of tubular diffusers (e.g. >4 meters) are required for such applications.

Insofar it has been a continuous task to provide larger tubular diffuser units, but: the longer the tubes are, the more difficult it becomes to arrange a membrane onto this tube. A further drawback is that a repair of such a membrane is difficult to perform and in most cases the complete (large) membrane must be replaced, causing high costs.

A tubular diffuser of such length requires a number of supports to keep the diffuser at its place within the aeration basin. It is known to fix the diffuser by corresponding supports/clamps/brackets which are mounted at the bottom of the aeration basin. During tests it was observed that due to axial movements of the diffuser (during use) the structural behaviour of the supports weakened and supports had even to be replaced.

It is an object of the invention to provide an aeration system for seawater applications, in particular for use in an aeration basin of a flue gas purification unit, which is simple in construction, reliable in use and preferably allows a longer service time compared with prior art installations.

The invention is based on the following considerations:

Any movement of the tubular diffuser (in an axial direction) requires a corresponding "bearing" of the diffusor. The supports mentioned, which primarily have the task to avoid any buoying upwards (german: Aufschwimmen) of the diffuser, in particular to avoid that a diffuser starts floating within the fluid (seawater) to be treated, may be used to provide the required bearing and to compensate any alterations in length (elongation/contraction) of the tubular diffuser body.

The basic idea of the invention is to provide sliding means within said support member, allowing the tubular diffuser to move in its axial direction within such a support, without affecting the support function of the support as such. It derives from this that the support is more or less a rigid item and does not move itself after it was installed at the bottom of a water basin.

A further finding is that the diffuser itself must be adapted to allow such axial movements.

Insofar another aspect of the invention is to arrange such "bearings" at diffusor sections which are not covered by a membrane, as it is a main function of the membrane to "bulge", when air is fed between the tubular body and the membrane and any expansion (inflating) of the membrane would contravene an axial movement of the tubular diffuser within the support.

Insofar the invention further stipulates to split the one, perforated, elastic membrane of one tubular diffuser into two or more parts and to arrange adjacent membranes at a distance to each other in the longitudinal direction of the diffuser to provide an uncovered surface of the tubular body (a membrane free section) between adjacent membrane zones and thus a sliding surface.

Preferably this membrane-free section of the tubular diffuser body is free of any air outlet ports.

Suitable membranes may have an axial length of for example one to four meters. Accordingly a tubular diffuser of ca. 7 m length requires three membranes, each of ca. 2 m length and allows 2 membrane free intermediate sections as well as 2 membrane free end sections of the diffuser, wherein each membrane free section has an axial length of approximately 0.25 m.

The provision of multiple (and shorter) membranes instead of one long membrane makes any replacement of a membrane easier, faster and cheaper. Another advantage is that the aeration is optimized. Despite this "splitting" of a diffuser membrane, a one piece diffusor pipe of considerable length can be used, for example of a length of up to 10 meters, depending on the material used for said diffusor pipe, e.g. Polypropylene.

In its most general embodiment the invention relates to an aeration system for seawater oxidation in a flue gas purification device, comprising a tubular diffuser with a tubular body, defining an inner hollow space and a central longitudinal axis, wherein the tubular body has zones featuring air outlet ports, each of which extends from the hollow space outwardly and through the tubular body, at least two tubular, perforated, elastic membranes, which are positioned one after the other in a direction of the central longitudinal axis as well as over and in contact with said zones of the tubular body featuring outlet ports, and with their corresponding end sections at a distance to each other, thereby defining at least one membrane-free section of the tubular body, at least one support member, which encircles the membrane-free section of the tubular body at least partially, and at least one sliding means, arranged between the support member and the membrane-free section of the tubular body, to allow a movement of the tubular body within the support member in the direction of the central longitudinal axis.

The sliding means may be displaceable within the support in an axial direction of the diffusor pipe and/or allow the diffusor pipe to slide within the sliding means (sliding rings) in its axial extension.

The aeration system and/or its components may be amended by one or more of the following features:

The support member (support part) comprises a leg, which in its mounted position extends substantially vertical from a first end at a bottom of a corresponding vessel, containing the seawater, upwardly to a second end, followed by a bracket, which encircles the membrane free section at least partially. Insofar the bracket can have the shape of a hook, a clamp, a ring etc. The term "bracket" includes all types of means to fasten the diffuser, i.e. to keep the diffuser in a defined position within the aeration basin.

According to one embodiment the support member comprises a bracket, which is ring-shaped and made of two half shells with one hinge in between and means for locking the bracket, when the two half shells commonly form a closed ring and encircle the tubular diffuser. These locking means may be flanges secured with a bolt.

The bracket may not only encircle the membrane-free section of the diffuser but may extend to (overlap) adjacent end sections of two membranes, again at least partially. This embodiment allows to cover two end sections of adjacent membranes and the sliding means, arranged in between these adjacent membranes, by one single support.

A membrane can be fastened at both its end sections to the tubular body by fixings means like clamps, bands or hose-clamps. These fixing means can be arranged at a distance to the respective free ends of the membrane, thereby defining two terminal sectors of the membrane between the corresponding fixing means and free ends, wherein both terminal sectors of each membrane are folded oppositely to each other in a manner to overlap the fixing means of the corresponding end zone and to provide two end sections, lying onto the central zone of the membrane. This design protects the fixing means against corrosive attack, in particular against corrosion by the surrounding liquid.

The shape of the sliding means is preferably adapted to the shape of the adjacent surfaces, i.e. the outer surface of the tubular body of the diffuser as well as the inner surface of the support, for example the inner surface of its bracket. Insofar a preferred design of the sliding means is a ring. This sliding ring can be part of the tubular body or part of the bracket. If the sliding ring is fastened to the support member, for example to a bracket, it may slide freely over the outer surface of the tubular body. The sliding means (ring) can also be a discrete (loose) part, arranged between the diffuser body and a bracket. A split ring makes it easier to fit the ring at the required place.

The sliding means may have a surface roughness, which is smaller than that of the tubular body to reduce the friction between adjacent parts.

A suitable material for the sliding means is polytetrafluorethylene (PTFE).

A concave profile of the sliding means/ring at least at its surface facing the tubular body also reduces friction between these parts.

In many cases the tubular body is made of a rigid material, for example a PVC-pipe (polyvinylchloride).

The construction and the material of the membrane may be selected according to prior art, including polytetrafluorethylene (PTFE), rubber, ethylene-propylene-diene (EPDM).

An aeration system for seawater oxidation of a flue gas purification unit comprises a header pipe, to which a plurality of tubular diffusers of the new type may be coupled in a way to allow a gaseous medium to flow through the header pipe into the tubular body of each tubular diffuser and from there through corresponding ports and membranes into the fluid to be aerated. For this purpose the diffusor pipes may be laminated to corresponding openings in the header pipe, even in case of different materials of diffusor pipes (e.g. Polypropylene—PP—) and header pipe (for example glass fibre reinforced plastics—GRP—).

Further features of the invention are described in the sub claims as well as in the other application documents.

Figure 2:
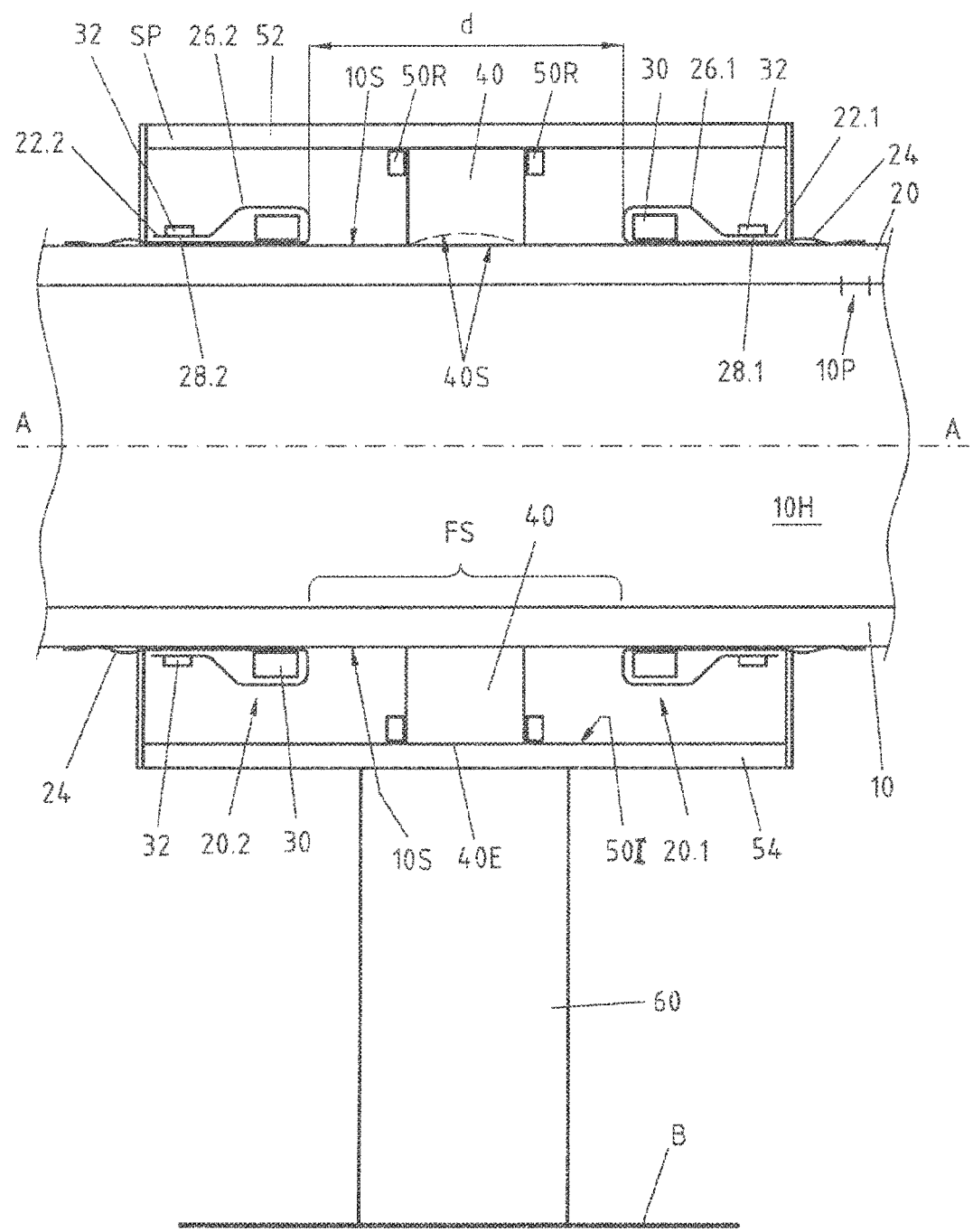
Figure 3:
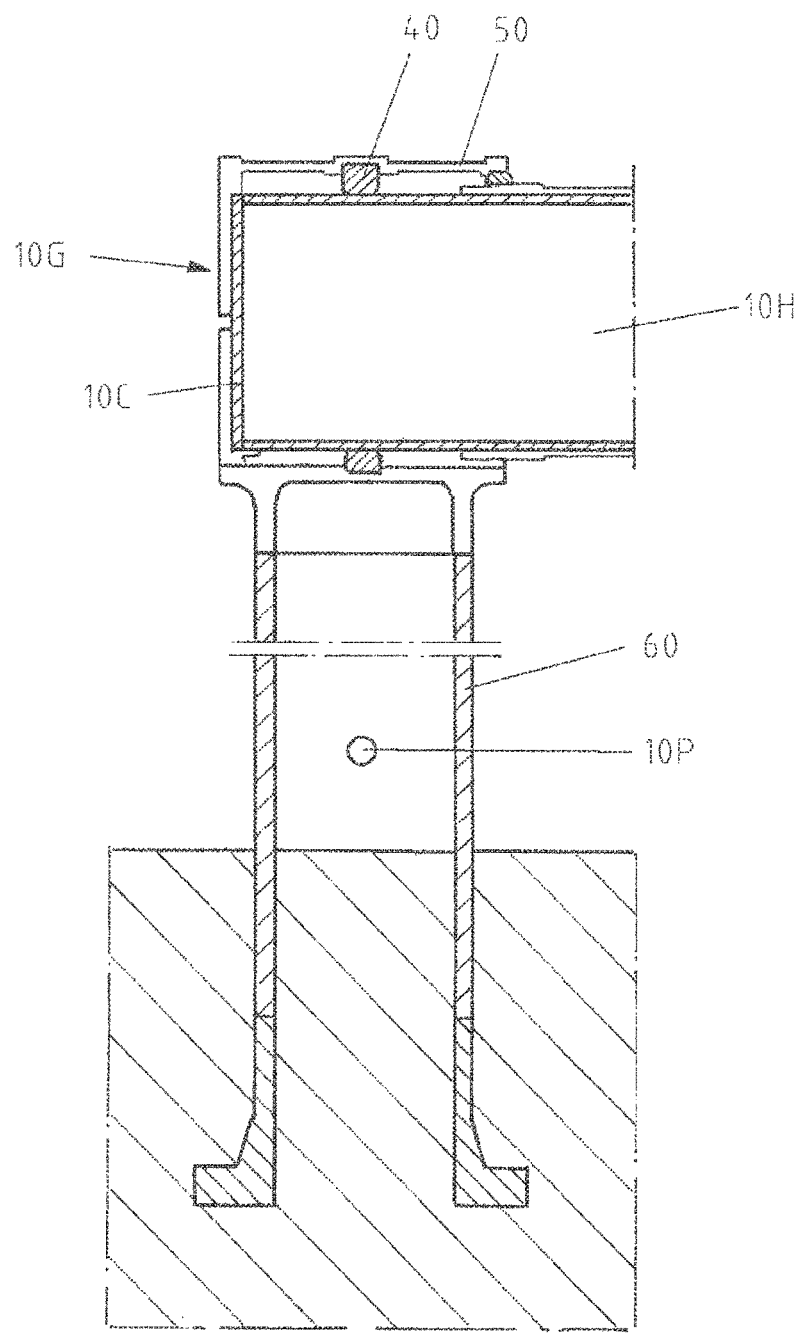
Figure 4:
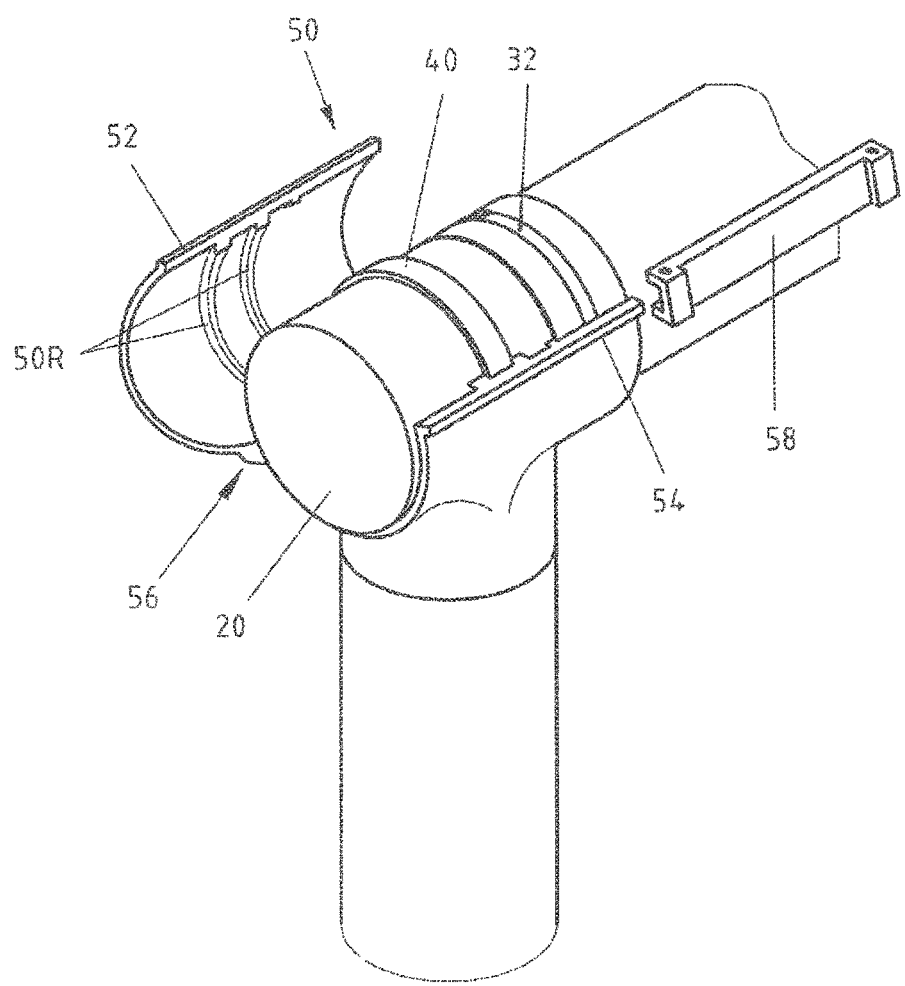

The invention will be further described with respect to the attached schematic drawing, wherein FIG. 1: is a side view onto a tubular diffuser arranged at the bottom of an aeration basin of a flue gas purification unit, FIG. 2: is an enlarged view onto section II as displayed in FIG. 1, partly cut away, FIG. 3: is an enlarged view onto section III as displayed in FIG. 1, partly cut away, FIG. 4: is an enlarged perspective view onto section II as displayed in FIG. 1, when the bracket is in its open state.

FIGS. 1-4 represent a tubular diffuser TD which comprises the following features:

one tubular body 10 of a total length L of 10 meters, defining an inner hollow space 10H and a central longitudinal axis A, wherein the hollow space 10H extends continuously between a first open end 10F of the tubular body 10 and a second closed end 10G, wherein the open end 10F is connected to a so-called header pipe HP to allow a gaseous medium like air to flow through the header pipe HP into the tubular body 10. A multiplicity of tubular diffusers TD is connected to one header pipe HP; therefore the header pipe HP has a larger inner diameter compared with each of the associated tubular bodies 10.

Each tubular body 10 features a plurality of ports 10P, each of which extends from the inner hollow space 10H outwardly and through the wall of the tubular body 10.

Three tubular, perforated and elastic membranes 20, each of a length of approximately 3 meters, are positioned over and in contact with the tubular body 10 and in spaced relationship to each other in a direction of the central longitudinal axis A.

FIG. 2 displays this distance d between adjacent membranes 20.

Each membrane 20 has two opposed end zones 20.1, 20.2 with corresponding free ends 22.1, 22.2 and one central zone 24 in between.

Each membrane 20 is fastened at both of its end zones 20.1, 20.2 to the tubular body 10 by fixing means 30, namely hose clamps, which hose clamps 30 are arranged at a distance to the respective free ends 22.1, 22.2 of the membrane 20, thereby defining two terminal sectors 26.1, 26.2 of the membrane 20 between the corresponding fixing means 30 and the free ends 22.1, 22.2.

Both terminal sectors 26.1, 26.2 of each membrane 20 are folded oppositely to each other in a manner to overlap the hose clamp 30 of the corresponding end zone 20.1, 20.2 and to provide two end sections 28.1, 28.2 lying onto a further part of the membrane 20.

In other words: Each membrane 20 is fastened to the tubular body 10 at a distance to its free ends 22.1, 22.2 to allow correspondingly defined terminal sectors 26.1, 26.2 to be folded and to overlap the clamps 30 and thus to protect the clamps 30 against the environment and thus against corrosion.

In this embodiment the end zones 20.1, 20.2 of the membrane 30 are not perforated to avoid any ingress of liquid into the space defined by the overlapping terminal sectors 26.1, 26.2 and thus to avoid any contact of the clamps arranged in said space with the environment.

Thereby corrosion of the fixing means is avoided and the service time of the membrane increased.

According to FIG. 2, the two end sections 28.1, 28.2 are further fastened (pressed against the central zone 24 and the tubular body 10 by corresponding hose clamps 32.

Between opposing terminal sectors 26.1, 26.2 of adjacent membranes 20 (i.e. along a "distance d", defining a membrane-free section FS), a PTFE sliding ring 40 is arranged with its inner cylindrical surface 40S touching the outer surface 10S of the tubular body 10, which is membrane-free.

In an alternative the inner surface 40S may be concave (see dotted line in FIG. 2)

The outer surface 40E of said sliding ring 40 touches an inner cylindrical surface 50I of a bracket 50 and is arranged between two ribs 50R, radially protruding from said surface 50I of the bracket 50.

The bracket 50 is ring-shaped and made of two half shells 52, 54 with one hinge 56 (FIG. 4) in between and means 58 (a latch, not displayed in detail) for locking the bracket 50 when the two half shells 52, 54 are in a closed position and commonly form a closed ring (FIGS. 2, 3).

The bracket 50 is part of a support member SP and followed by a leg 60 which is fastened to a bottom B of a treatment vessel, for example an oxidation basin for the after treatment of a seawater based absorbent used in a gas scrubber to purify a flue gas from a power plant.

The provision of the sliding ring 40 around a membrane free section of the tubular body 10 allows a movement of the tubular body 10 in an axial direction (longitudinal direction) A-A of the tubular diffuser TD because of a low friction between the inner ring surface 40S and the outer surface 10S of the tubular body 10, while the sliding ring 40 itself remains at its place (secured by said ribs 50R), as the support SP does.

Insofar the position of tubular diffuser TD remains substantially constant, while axial movements can be compensated by said support SPs.

FIG. 3 displays the free end of a tubular diffuser TD with a cap 10C, closing its free end.

Independently of the specific design of the tubular diffusors and support members as disclosed above the aeration system allows a further optimization with respect to the connection between these diffusor pipes and an associated header pipe.

As disclosed above numerous tubular diffusors TD (of diameter x) are fitted to one header pipe HP of diameter X, with X>>x. While the much bigger header pipe is typically made of a GRP material, the tubular diffusors of the required length will often be made of a cheaper material like polypropylene (PP), thereby causing the problem of laminating one to the other. To enable this lamination (layup) it is proposed to coat the corresponding end sections (connecting end) of the PP diffusor pipes with a PP based textile, allowing to increase the surface (surface roughness) vis-à-vis the header pipe. This can be done as follows:

heating up the surface of the PP diffusor pipe until the surface gets viscous (soft), applying a PP based textile onto the heated surface, for example by winding, and preferably after pre-heating the textile itself, eliminating any (air) bubbles between pipe surface and textile and/or within the textile, for example by applying pressure onto the textile coated surface, cooling down of the coated PP pipe.

The textile may be a net (german: Gewebe), a web (german: Gewebe), a roving/german: Roving), a stich bonded fabric (german: Gewirk) or a knitted fabric (german: Gestrick), either as such or applied onto a basic sheet (film), which sheet is then the side facing the pipe surface. This allows to heat up the sheet and to bond the textile via the sheet to said original diffusor surface.

This pre-treated diffusor pipes may be laminated in a further treatment step to the header pipe, in particular into corresponding holes (openings) of the GRP header pipe. This can be done in a conventional manner, for example by using an epoxy resin or vinyl ester resin as joining element/putty.

The invention claimed is:

1. An aeration system for seawater oxidation in flue gas purification devices, comprising
   a) a tubular diffuser (TD), comprising a tubular body (10), defining an inner hollow space (10H) and a central longitudinal axis (A), wherein the tubular body (10) has zones featuring air outlet ports (10P), each of which extends from the hollow space (10H) outwardly and through the tubular body (10),
   b) at least two tubular, perforated, elastic membranes (20), which are positioned one after the other in a direction of the central longitudinal axis (A) as well as over and in contact with said zones of the tubular body (10) featuring outlet ports (10P), and with their corresponding end-zones at a distance (d) to each other, thereby defining at least one membrane-free section (FS) of the tubular body (10),
   c) at least one support member (SP), which encircles the membrane-free section (FS) of the tubular body (10) at least partially, and
   d) at least one sliding means (40), arranged between the support member (SP) and the membrane-free section (FS) of the tubular body (10), to allow a movement of the tubular body (10) within the support member (SP) in the direction of the central longitudinal axis (A).

2. The aerations system according to claim 1, wherein the support member (SP) comprises a leg (60), which in its mounted position extends substantially vertical from a first end, at a bottom (B) of a corresponding vessel, containing the seawater, upwardly to a second end, followed by a bracket (50) which encircles the membrane-free section (FS) at least partially.

3. The aeration system according to claim 1, wherein the support member (SP) comprises a leg (60), which in its mounted position extends substantially vertical from a first end, at a bottom (B) of a corresponding vessel, containing the seawater, upwardly to a second end, followed by a bracket (50) which encircles the membrane-free section (FS) and adjacent end zones of two membranes at least partially.

4. The aeration system according to claim 1, wherein the sliding means (40) is ring shaped.

5. The aeration system according to claim 1, wherein the sliding means (40) is a discrete sliding ring.

6. The aeration system according to claim 1, wherein the sliding means (40) is a discrete sliding split ring.

7. The aeration system according to claim 1, wherein the sliding means (40) is fastened to the support member (SP).

8. The aeration system according to claim 1, wherein the sliding means (40) has a surface roughness, which is smaller than that of the tubular body (10).

9. The aeration system according to claim 1, wherein the sliding means (40) is made of polytetrafluorethylene (PTFE).

10. The aeration system according to claim 1, wherein the sliding means (40) has a concave profile at its surface (40S) facing the tubular body (10).

11. The aerations system according to claim 1, wherein the support member (SP) comprises a bracket (50), which is ring-shaped and made of two half shells (52, 54) with one hinge (56) in between and means for locking the bracket (50) when the two half shells (52, 54) commonly form a closed ring.

12. The aerations system according to claim 1, wherein each membrane (20) is fastened at both its end sections to the tubular body (10) by fixings means (30).

13. The aerations system according to claim 12, wherein the fixing means (30) are arranged at a distance to the respective free ends of the membrane (20), thereby defining two terminal sectors of the membrane (20) between the corresponding fixing means (30) and free ends, wherein both terminal sectors of each membrane (20) are folded oppositely to each other in a manner to overlap the fixing means (30) of the corresponding end zone and to provide two end sections, lying onto adjacent parts of the membrane (20).

\* \* \* \* \*